(12) United States Patent
Utley et al.

(10) Patent No.: US 8,925,807 B2
(45) Date of Patent: Jan. 6, 2015

(54) AUDIO PORT POWER GENERATION CIRCUIT AND AUXILIARY DEVICE

(71) Applicants: Daniel Utley, Gilbert, AZ (US); Phillip Gerlings, Chandler, AZ (US)

(72) Inventors: Daniel Utley, Gilbert, AZ (US); Phillip Gerlings, Chandler, AZ (US)

(*) Notice: Subject to any disclaimer, the term of this patent is extended or adjusted under 35 U.S.C. 154(b) by 0 days.

(21) Appl. No.: 14/205,963

(22) Filed: Mar. 12, 2014

(65) Prior Publication Data

US 2014/0265642 A1    Sep. 18, 2014

Related U.S. Application Data

(60) Provisional application No. 61/781,083, filed on Mar. 14, 2013.

(51) Int. Cl.
*G06K 5/00* (2006.01)
*H02J 1/00* (2006.01)

(52) U.S. Cl.
CPC ........................................ *H02J 1/00* (2013.01)
USPC ........................................... 235/380; 381/107

(58) Field of Classification Search
USPC ................... 235/380; 381/107, 120; 330/11
See application file for complete search history.

(56) References Cited

U.S. PATENT DOCUMENTS

| | | | | |
|---|---|---|---|---|
| 6,552,512 | B1* | 4/2003 | Harris | 320/107 |
| 8,283,979 | B2* | 10/2012 | Stanley | 330/251 |
| 8,336,771 | B2* | 12/2012 | Tsai et al. | 235/380 |
| 2012/0293001 | A1* | 11/2012 | Chan et al. | 307/66 |
| 2013/0034248 | A1* | 2/2013 | Mizobuchi | 381/120 |
| 2013/0057342 | A1* | 3/2013 | Zhu | 330/127 |

* cited by examiner

*Primary Examiner* — Ahshik Kim
(74) *Attorney, Agent, or Firm* — Gregory Stauf

(57) ABSTRACT

A power generation circuit and process for providing electrical power and data transfer by means of a module attached to the audio port of a mobile electronic device. Power and data may be exchanged with an auxiliary device, which may be a sensor or a data processing device. A description of several possible power generation circuits is provided, as well as a description of different sensors and data processing devices which may be attached to a power generation circuit. The power generation circuit is particularly designed to provide a low interference and low voltage ripple output with high total power availability and efficiency.

27 Claims, 8 Drawing Sheets

AUDIO PORT POWER GENERATION CIRCUIT AND AUXILIARY DEVICE

CROSS REFERENCE TO RELATED APPLICATIONS

This application is a U.S. Utility application taking priority from U.S. Provisional application No. 61/781,083 filed Mar. 14, 2013, and herein incorporated by reference.

BACKGROUND OF THE INVENTION

References

U.S. Pat. No. 8,336,771 B2, HwaiSain Tsai, issued Dec. 25, 2012. U.S. Pat. No. 7,810,729, to Robert E. Morley, Jr., issued Oct. 12, 2010. Publication EP2230605A1 to Mitchell Adler, published Sep. 22, 2010. University of Michigan HiJack Project, copies of relevant documents for which were included with the filing of Provisional 61/781,083 from which this filing takes its priority. Kickstarter project by listed inventors, copies of relevant documents for which were included with the filing of Provisional 61/781,083 from which this filing takes its priority.

The invention described herein relates generally to a method of producing electrical power from the audio output of a mobile electronic device, and using it to operate another auxiliary or peripheral device. A wide variety of mobile electronic devices such as, but not limited to, mobile phones, whether "smart" or not, mobile music players, laptops and tablet computers have audio output jacks. Currently there are a wide variety of auxiliary devices, including, but not limited to, industrial, chemical, medical, and environmental sensors, as well as data processing systems such as smart or credit card readers which are stand-alone devices.

SUMMARY DISCLOSURE OF INVENTION

The invention described herein relates generally to a method of generating useful electrical power from an audio port on a mobile electronic device. This electrical power is used to operate one or more auxiliary devices which may have sensors, designed to make measurements such as, but not limited to, environmental conditions, including chemical, physical and electromagnetic conditions, and conditions relating to a biological organism, in particular medical conditions. It would be possible to use the computational system built into mobile electronic devices to provide the data processing needed to operate these sensors, and the electrical supply system in these mobile electronic devices to provide the power needed to operate these sensors, thus leaving only the relatively inexpensive sensor module itself needing to be provided as an auxiliary device. While there are a wide variety of data inlet/outlet ports on these mobile electronic devices, complicating the task of designing general purpose auxiliary devices which could be operated by these mobile electronic devices, by contrast audio ports are more standardized in format across a variety of mobile electronic devices than data or power ports are, coming primarily in 2.5 mm, 3.5 mm, and 6.3 mm jack configurations. This has the potential to allow design of auxiliary devices which could be connected to and operated by a wide range of mobile electronic devices. Unfortunately audio ports are not normally designed to provide any significant levels of voltage or power, therefore other systems which generate power from these audio ports typically step up or amplify voltages to attain voltage levels needed to operate circuits. Such stepping up of voltage reduces efficiency, allowing generation of only a few mW of power, not enough to power many potential auxiliary devices. The invention described herein would provide the combination of software and hardware needed to convert the power available from an audio port in an efficient means while providing adequate voltage to operate a wide variety of auxiliary devices.

One embodiment of this invention provides dual voltage outputs, such as about −1.2/+1.2 VDC. One embodiment of this invention passes signal information back and forth from an auxiliary or external device through the audio port of a mobile electronic device, such that software on the mobile electronic device can interpret the signal information from this auxiliary or external device. These functions can be combined, with, for example, signals and power both being passed through the same audio port. One embodiment of this invention relates to powering and collecting data from one or more external sensors, capable of measuring environmental conditions near these sensors. One embodiment of this invention relates to powering and collecting data from an external device designed to measure electromagnetic fields such as, but not limited to, near field RF such as from near field RF tags in smart cards, and magnetic fields from cards such as credit or security cards.

MODE(S) FOR CARRYING OUT THE INVENTION

Detailed Description

Figure 1:
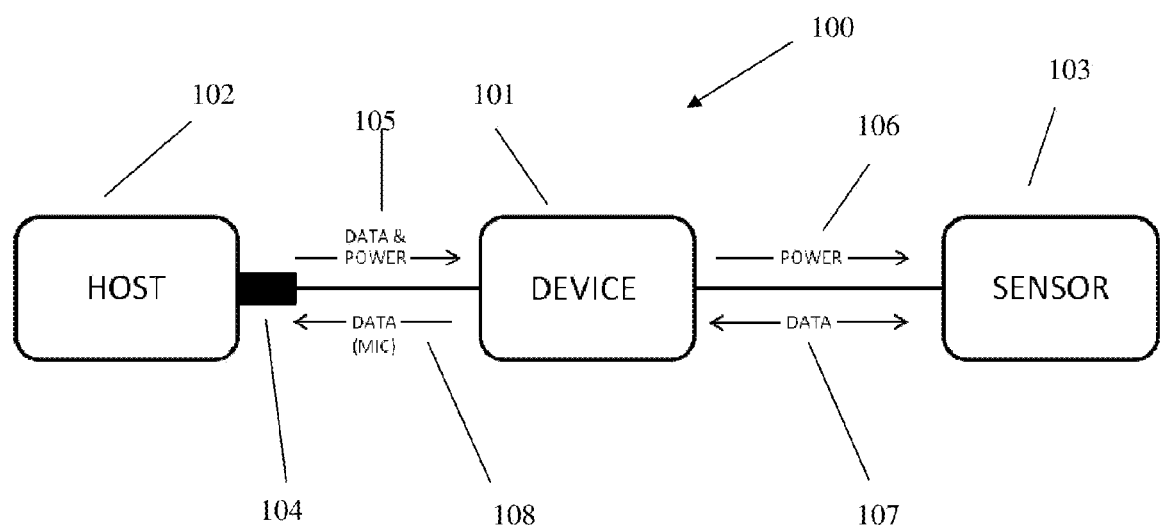
FIG. 1 shows a block diagram of a mobile electronic device or Host, a power and data processing circuit or Device and an auxiliary device or Sensor.

The present invention and its various embodiments are described below, with reference to figures as necessary. Reference numbers are used to match particular elements described in the text with those shown in figures. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

Generally speaking, the present invention describes an apparatus and associated methods of operation and construction for a power supply system which draws power from an audio port on a mobile electronic device such as, but not limited to, a mobile phone, a smartphone, a tablet computer, a laptop computer, a personal computer, a Mp3 player or other music player, or any other portable device having an audio port. This power can be supplied to one or more auxiliary devices external to the mobile device, in particular auxiliary devices which sense or communicate with the environment external to the mobile device. These auxiliary devices may be intended to monitor environments including physical and biological environments, and include, but are not limited to, temperature sensing, moisture content sensing, magnetic field sensing, electrical field sensing, liquid or gas flow sensing, weight/mass sensing, radiation sensing, biological marker sensing, vibration sensing, chemical sensing, pressure sensing, and distance sensing. Finally, this same audio port is used to pass data either unidirectionally or bidirectionally between the mobile device and the auxiliary device or devices, allowing a wide variety of auxiliary devices to be attached to and powered by the mobile electronic device. Advantages this apparatus may possess include higher available power than other methods of power generation, avoiding the need for electrolytic capacitors or transformers, provision of a dual voltage power supply which allows for more flexibility in auxiliary devices and use of analog circuits without additional circuitry, and low induced noise or interference both to auxiliary devices and to the mobile electronic device being used as a power source.

Examples of auxiliary devices which may be connected to the mobile electronic device and thereby draw power from it by means of the audio port include, but are not limited to, thermometers (thermocouple, thermistor, RTD, IR), scales (cooking, body weight, baby scales, shipping, fishing, postage), relative humidity, hygrometers (greenhouses, food storage, stores), pressure transducer (tire gauge, HVAC, vacuum gauge, altimeter, barometer, water depth gauge), moisture sensors (plants, soil, paper, industrial, cooking), flow meters (anemometer for wind speed, liquid flow measurement), strain measurement (torque, force), light meters (intensity, spectral distribution, luminance, lux, photography), color sensors (paper test strips for chemical sensing, paint testers, color identifiers or matchers), chemical sensors (PH, alcohol content, breathalyzer, toxic gases such as CO2, chlorine, ammonia, ozone or CO, explosive gases such as gasoline vapors or natural gas, water chemistry such as chlorine, salinity, ORP, TDS), chlorophyll content meters, fluorometers, vibration dosimeters, seismic meters, shock sensors, electromagnetic sensors (electric field, current, magnetic field strength and direction, stud finder, circuit breaker finder, wire finder, buried cable finder), distance and position measurement (length, ultrasonic, laser, encoder wheels, hall effect, displacement or gap probes), radiation measurement (Geiger counter), biological condition monitors (blood pressure, pulse oximeter, sleep, bed wetting, position such as a fall sensor), protein detection sensors for early stage disease detection, biological marker testing (pregnancy, glucose or blood sugar), and data input devices such as a bar code scanner, a magnetic strip reader or a RFID reader for smart credit cards or RFID tags. In many cases these types of auxiliary devices are now available in cheap, compact forms for which the display, power storage unit, control system and software are the primary costs. Using the mobile electronic device, which possesses all of these attributes, to power and provide data processing for the auxiliary device would reduce the cost of these auxiliary devices and make them more usable. For broad applicability it is helpful to use a port which is frequently found on the mobile electronic devices such as the audio port. Audio ports are usually found in one of two standards, a 2.5 mm or a 3.5 mm jack. An audio out (speaker/headphone) port or both audio out and audio in (microphone) port may be used with this apparatus depending on the requirements of the auxiliary circuit.

FIG. 1 shows a schematic representation of this apparatus 100, with a power and control module 101 connected to a host mobile electronic device 102 and interfacing between that and an auxiliary device 103. Module 101 is connected to mobile electronic device 102 via an audio port 104 on the mobile electronic device 102. Module 101 extracts power from mobile electronic device 102 by means of power connection 105, and passes it to auxiliary device 103 by means of power connection 106. Data from auxiliary device 103 is read by module 101 via connection 107 and passed back to mobile electronic device 102 by means of connection 108. Power connection 105 may contain encoded data from mobile electronic device 102 to be decoded by module 101. Power connection 106 and data connection 107 may be the same wire, or may be different wires, depending on the needs of auxiliary device 103 and the capabilities of module 101.

Figure 2A:
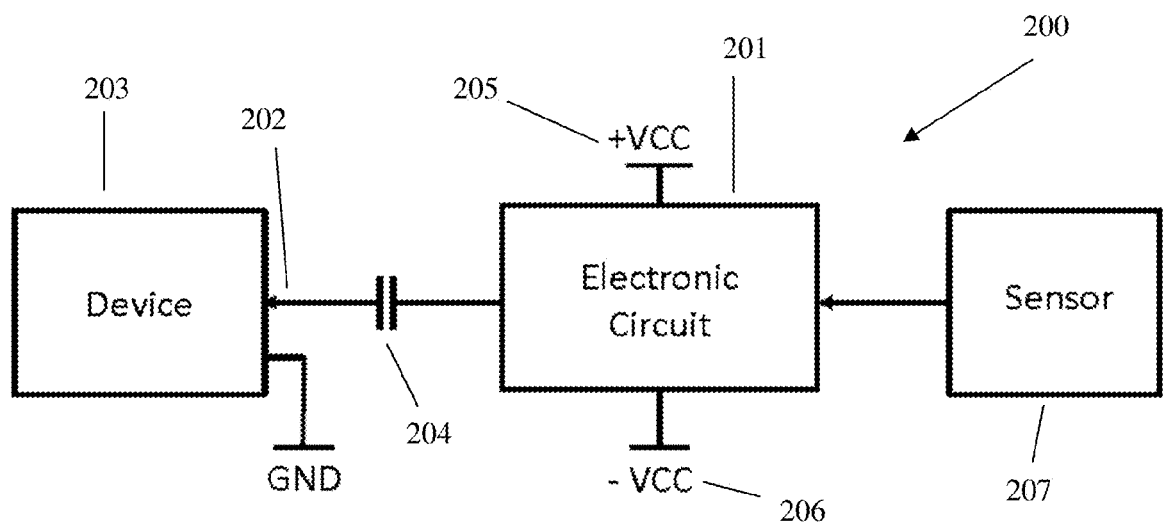
FIG. 2A shows a more detailed block diagram of a mobile electronic device, a signal and data processing circuit and an auxiliary device or sensor.

In one embodiment of this apparatus, shown in FIG. 2A, the apparatus 200 has a data processing circuit, module 201 which carries out signal conditioning and data management. It is connected to the audio port 202 of a mobile electronic device (Device B) 203. Capacitor 204 is used to couple the audio signal from module 201 going to port 202 while providing DC voltage isolation between module 201 and mobile electronic device 203. The positive +VCC 205 and negative −VCC 206 voltage pair which is used to provide power to circuit module 201 is derived from the system shown in FIG. 2B. The circuitry internal to module 201 is not directly connected to the ground of the mobile electronic device, which allows, for example, an approximately +/−1.2 VDC signal to provide a total operating voltage of about 2.4 VDC to this circuitry, allowing for a wider variety of low power chips to be used in module 201. This also allows for a wider variety of auxiliary devices 207, which may include but are not limited to sensors, transmitters, wireless signal generators, encryption systems and additional data processing units, to be used. Up to about 67 mW can be generated at a total voltage of about 2 VDC, and up to about 90 mW at lower voltages. In a preferred embodiment of this apparatus auxiliary device 207 does not have its own power supply, but rather uses the signal from the audio port 202 to generate all of the power needed via the power generation circuit in FIG. 2B. Software on mobile electronic device 203 may be used to cause the mobile electronic device 203 to produce a continuous or time varying signal as a power source for the power generation circuit for module 201, preferably a time varying signal. This time varying signal may be provided in a range from about 0.1 Hz to about 1 Mhz. In a particular embodiment this time varying signal may be provided in the normal about 20 Hz to about 22 kHz range of audio equipment. In another particular embodiment this time varying signal may be in the 0.1 to 20 Hz range, which may be preferable for applications with a lower voltage demand from the auxiliary device, or in which lower voltage output is available from the mobile device. In any embodiment of this apparatus, module 201 and the power generation circuit of FIG. 2B may be combined with auxiliary device 207 as one physical unit, or any of these may be separate units configured to connect to one or many different types of auxiliary unit 207. Module 201 or auxiliary device 207 or both may include a small power storage device such as, but not limited to, a battery, a capacitor or a super capacitor.

Figure 2B:
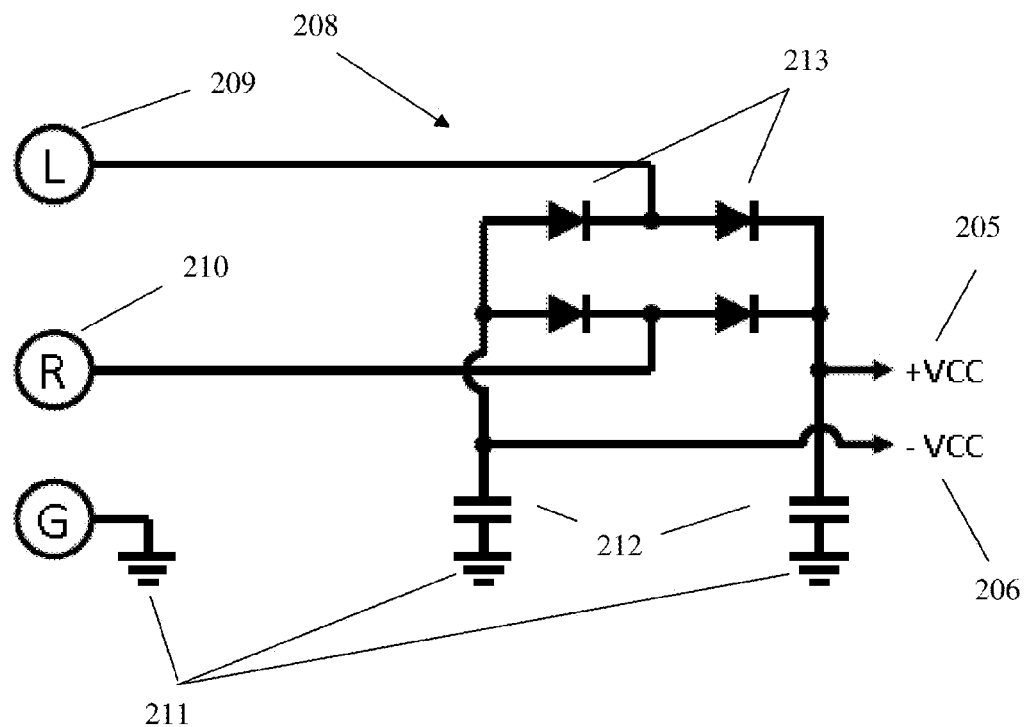
FIG. 2B shows a power generation circuit for this system.

In this embodiment of this apparatus a circuit diagram 208 is shown in FIG. 2B. In this embodiment, two out of phase time varying electrical signals which may comprise, but are not limited to, a sine wave, a triangular wave, a square wave or a random wave are generated by the mobile electronic device 203 and output at the Left 209 and Right 210 outputs of the audio port 202. These time varying signals may be provided in a range from about 0.1 Hz to about 1 MHz. In a particular embodiment this time varying signal may be provided in the normal about 20 Hz to about 22 kHz range of audio equipment. In another particular embodiment this time varying signal may be in the 0.1 to 20 Hz range, which may be preferable for applications with a lower voltage demand from the auxiliary device, or in which lower voltage output is available from the mobile device. Note that the ground 211 of electronic device 203 is only common to capacitors 212 as all other circuits within the device are referenced to −VCC 206. Low forward voltage drop $V_f$ Schottky diodes 213 having forward voltage drop of about 0.3 VDC are used to generate a +DC voltage 205 and a −DC voltage 206, which are filtered by capacitors 212. The DC voltage and current thereby produced can be used to run the circuits of module 201 and the auxiliary device 207 shown in FIG. 2A. This embodiment has the advantage of potentially reducing voltage ripple at the supply output and current ripple supplied by the audio port of the mobile electronic device 203 and producing more stable power feeding module 201 and auxiliary device 207 compared to an embodiment such as that shown in FIG. 3B.

In one embodiment of this apparatus the auxiliary device 207 may generate some combination of non time varying DC and time varying signal which is fed back to module 201. If a time varying signal is generated, it may be any combination of analog and digital signals. Module 201 may thereby have analog circuitry, digital circuitry, or a combination thereof for some combination of power and signal processing. Module 201 then processes this signal and passes it via encoded data to the mobile electronic device 203 through audio port 202. This encoding may occur via systems including, but not limited to, DTMF (dual tone multi-frequency), FSK (frequency shift keying), PSK (phase shift keying) or audio modem standards. In a preferred embodiment electronic device 203 would then be able to read this signal and process it via software which it may be built or included with or which may be installed after construction of the electronic device 203 in order to display it to a user on the display of electronic device 203, by means including, but not limited to, SDK, an "app" or application or by use of the operating system of electronic device 203. If the electronic device 203 has capability to send information thus received from auxiliary device 207 wirelessly, such as by systems including, but not limited to, Wifi, Bluetooth, 3G, CDMA (Code Division Multiple Access), or LTE (Long Term Evolution, also referred to as 4G LTE), it may do so. In a preferred embodiment of this device the ground of the circuitry of module 201 is referenced to −VCC 206 and not connected to the ground of the mobile electronic device 211. Using a referenced supply grounding scheme or floating ground allows more effective use by circuits in module 201 and auxiliary device 207 of the full +/−voltage range provided by outputs 205 and 206.

In another embodiment this module 201 could also have a surge suppressor in it, to condition the power from the mobile electronic device 203 or from power generation circuit 208 in order to prevent damage to auxiliary devices 207 and circuits in module 201. In an alternative embodiment, instead of a conversion or conditioning unit in the module 201, a conversion or conditioning unit could be built into the plug system which connects to mobile electronic device 203 via the audio port 202, or placed along the length of the cord, for example with the capacitive coupler 204. Conditioning units such as surge suppressors can be employed for any power or signal source delivered by the module 201, such as, but not limited to, AC voltage, DC voltage, audio data lines, and so on. Other features such as on/off switches and status lights could clearly be included on or in the module 201 or the auxiliary device 207. Auxiliary device 207 can be enclosed within module 201. Module 201 or auxiliary device 207 or both may include a small power storage device such as, but not limited to, a battery, a capacitor or a super capacitor.

In another embodiment, auxiliary device 207 and or module 201 could comprise a power generation system such as, but not limited to, a solar cell, a human movement-based power generator, thermoelectric generator, a piezo electric generator, or a flow based power generator such as a wind or water powered generator. Module 201 or circuit 208 or some combination thereof could then feed power back to mobile electronic device 203 through the audio port in order to recharge the mobile electronic device 203 as long as mobile electronic device 203 is designed to allow for two-way passing of power. If module 201 is designed to allow two-way passing of power, auxiliary device 207 and or module 201 could include one or more power generating elements, such as the aforementioned solar cell, and power consuming elements, such as a swipe card reader, allowing the system to be used for long periods of time away from standard power sources. While in general it is intended that auxiliary device 207 and or module 201 not have its own energy storage, rather that it receives power from mobile electronic device 203 by means of power generating circuitry 208, no embodiment of this apparatus is intended to exclude the possibility of some energy storage in auxiliary device 207 and or module 201 such as, but not limited to, a backup battery, a battery or capacitor for surge demand, or a battery or capacitor intended to prevent loss of memory data. When a form of energy storage is available it can be charged by means of the power generating circuitry in module 201, drawing thereby from mobile electronic device 203 in accordance with the apparatus described herein, or one or more power generating elements such as, but not limited to, power generating circuit 208 on or in auxiliary device 207 or module 201.

Figure 3A:
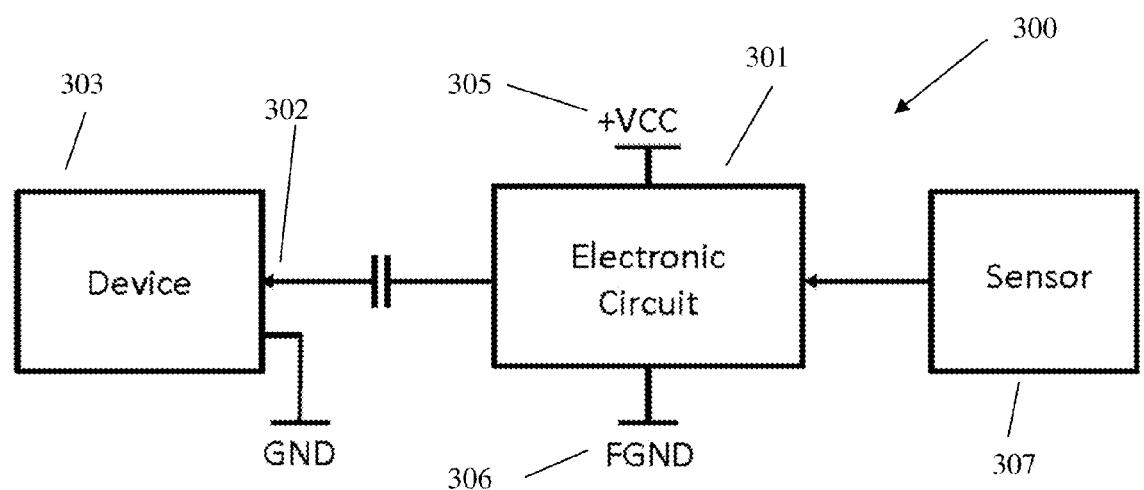
FIG. 3A shows a more detailed block diagram of another embodiment of a mobile electronic device, a signal and data processing circuit and an auxiliary device or sensor.
Figure 3B:
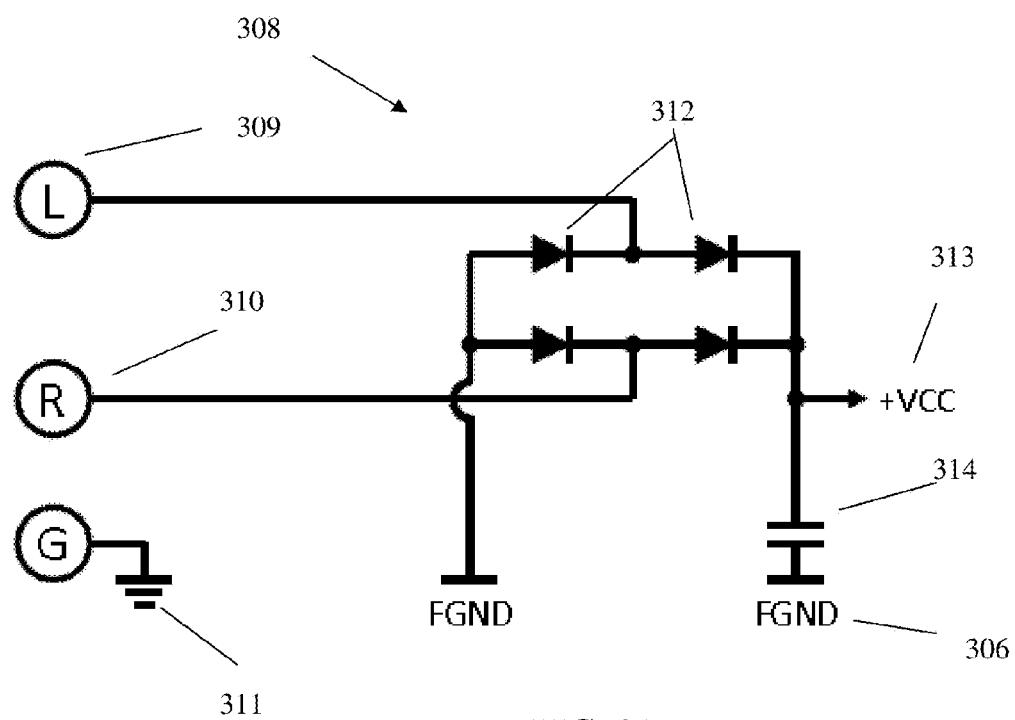
FIG. 3B shows a power generation circuit for this system.

In another embodiment 300 of this apparatus shown in FIG. 3A the data processing circuit comprising signal and data processing module 301 has a floating ground 306. A diagram of the power generating circuit which would provide power to module 301 is shown in FIG. 3B. A typical audio-out port 302 has at least two channels, for Left 309 and Right 310 outputs, plus a ground (GND) 311. A Personal Computer or laptop often has a separate microphone jack, while most smaller mobile devices contain 4 conductors with Left 309, Right 310, ground 311 and microphone wires (not shown) all in one combined audio port. It is intended in this disclosure for the term "audio port" to refer to any combination of physical ports including audio out or speaker jacks and audio in or microphone jacks, separately or in combination. The apparatus described herein is intended to work with any of these combinations, by using different configurations of wires and plugs. In this embodiment, two out of phase time varying electrical signals which may comprise, but are not limited to, a sine wave, a triangular wave, a square wave or a random wave are generated by the mobile electronic device 303 and output at the Left 309 and Right 310 outputs of the audio port 302. These time varying signals may be provided in a range from about 0.1 Hz to about 1 MHz. In a particular embodiment this time varying signal may be provided in the normal about 20 Hz to about 22 kHz range of audio equipment. In another particular embodiment this time varying signal may be in the 0.1 to 20 Hz range, which may be preferable for applications with a lower voltage demand from the auxiliary device, or in which lower voltage output is available from the mobile device. In this embodiment, low forward voltage drop $V_f$ Schottky diodes 312 having forward voltage drop of about 0.3 VDC are used to generate a +DC voltage 313 referenced to a floating ground 306. The +DC voltage 313 is filtered by capacitor 314. The DC voltage and current thereby produced can be used to run the circuits of module 301 and auxiliary device 307. Floating ground 306 is kept isolated from the device ground 311.

Figure 4:
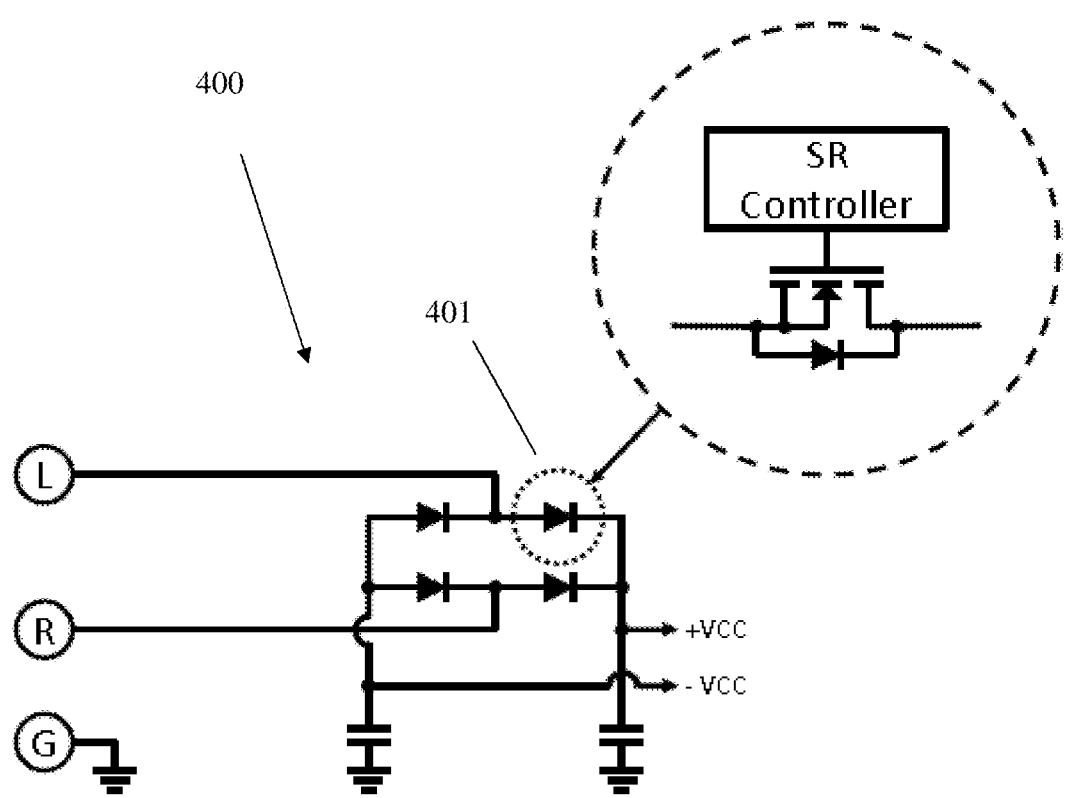
FIG. 4 shows a circuit for a power generation circuit with synchronous rectification.

In another embodiment of this apparatus, shown in FIG. 4, a more sophisticated version 400 of the power generation circuit 208 of FIG. 2B is shown. This involves synchronous rectification circuits that replace the low $V_f$ diodes 213 with active switches 401 such as MOSFETs to create a more efficient power circuit. This synchronous rectification (SR) circuit adds the benefit of higher output voltage and power capability as it provides a more efficient means of rectification. In a specific embodiment of a synchronous rectification circuit the circuit could be implemented in a single integrated circuit, which may be programmable or custom designed. This embodiment is one means to achieve synchronous rectification with multiple other embodiments available and known to those skilled in the art. No embodiment of this apparatus is intended to exclude the possibility of other methods and/or systems to achieve synchronous rectification.

Figure 5:
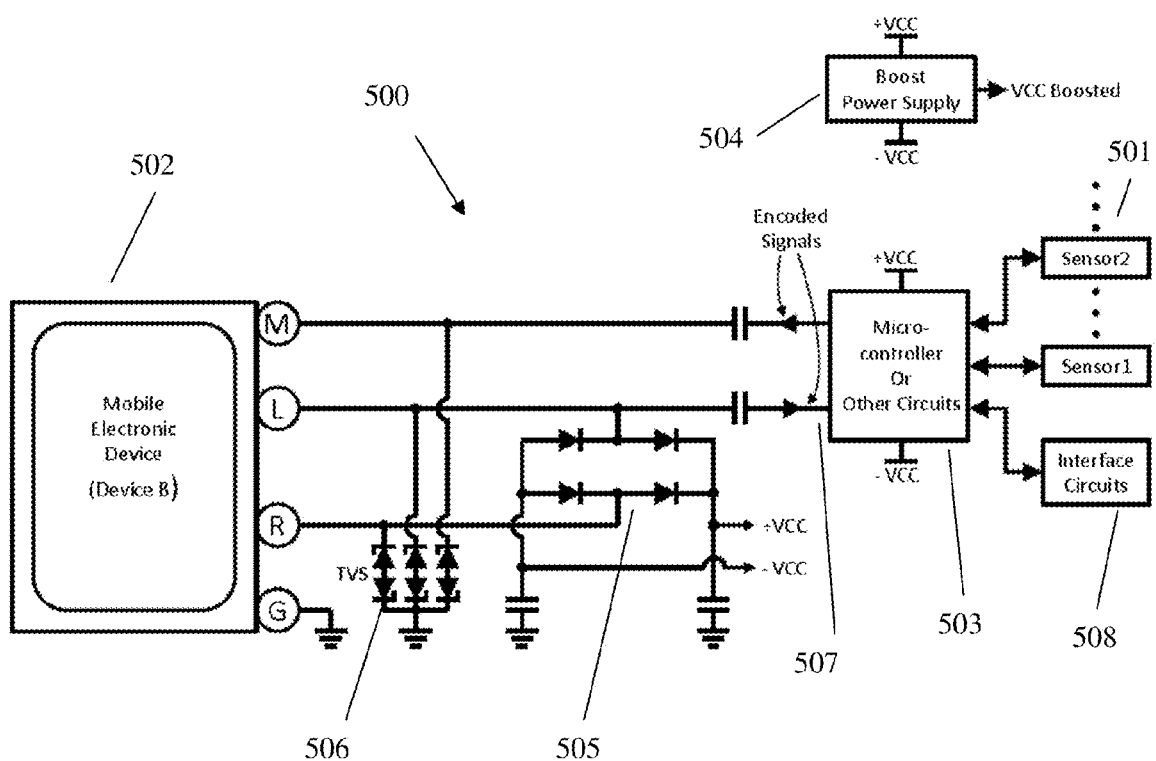
FIG. 5 shows a block diagram of another embodiment of a mobile electronic device, a signal and data processing circuit, a power generation circuit and an auxiliary device or sensor incorporating bidirectional data communication, a voltage booster and a surge suppressor.

In another embodiment of this invention, a system for bidirectional communication is described and shown in the circuit diagram 500 of FIG. 5. Many sensor circuits only require one-way communication. For instance, an auxiliary device 501 comprising a thermometer may only need to communicate the temperature data to the mobile electronic device 502 without the need for the mobile electronic device 502 to communicate to the auxiliary device 501, and without any need for additional circuitry 503. In these cases, using just the microphone input on the mobile electronic device 502 as a means of data communication may be adequate. However, there may be sensors or other circuit designs that need to receive communications from the mobile electronic device 502 for various reasons. In these cases, communication is established between the mobile electronic device 502 and the auxiliary device 501 by means of encoding the data within the power generation signal. An example of such encoding may include, but is not limited to, DTMF (dual tone multi-frequency), FSK (frequency shift keying), PSK (phase shift keying) or audio modem standards applied to the power generation signal generated by the mobile electronic device 502. More specifically, the power signal could be modulated between, for example, about 500 Hz and about 700 Hz and still be able to supply power while encoding the appropriate data for later decoding by the device microcontroller or other circuits in the data processing circuit module 503. This system offers the advantage of maintaining the high level of power and voltage available by using both audio channels to deliver power from the mobile electronic device 502, rather than using one audio channel for power and the other for receiving encoded data at module 503 from mobile electronic device 502, and using module 503 to send encoded data to the microphone input on mobile electronic device 502. Such a system which splits power and data across three separate channels requires amplification of the single audio channel used for power in order to achieve useful voltage, which may severely limit its total power output. In some embodiments of this invention, circuit or microcontroller 503 may also serve other functions, such as, but not limited to, storing calibration factors for a sensor 501, and amplifying signals from a sensor 501.

In another embodiment of this apparatus shown in FIG. 5 boost power supply 504 is used, which may take the form of, but is not limited to, a DC voltage up-converter or current up-converter. In particular, since the output of the energy generation circuit 505 is typically 2-2.5 VDC, it can be useful to add a higher voltage supply as some sensor circuits as well as other circuits may require a voltage higher than 2V to function properly. Physically this may be placed in module 503 or may be incorporated into auxiliary device 501 or circuit elements may be placed in both module 503 and auxiliary device 501. The boost supply allows a wider variety of auxiliary devices 501 to be attached via module 503 to mobile electronic device 502. It may include a small power storage device such as, but not limited to, a battery, a capacitor or a super capacitor. A surge suppressor or power conditioner 506 may also be included in module 503 or auxiliary device 501 or both. Encoded signals 507 may be passed back and forth between the mobile electronic device 502 and the module 503, using encoding/decoding methods as discussed elsewhere. Interface circuits 508 may be used for purposes including, but not limited to, switching signals, using optoelectronic couplers to connect signals, and translating signals between the module 503 and the auxiliary device 501.

Note that in all embodiments of this apparatus, although only one auxiliary device 501 is mentioned, it is clearly possible to use multiple auxiliary devices 501, either of a similar type or of different types or in any combination thereof, to the extent the power generated by the apparatus suffices. It is also possible to include multiple auxiliary devices and rotate power between them, allocating power based on either environmental or mobile electronic device input as may be desirable. It would also be possible to have an auxiliary device 501 only connected part of the time to module 503, so that for example multiple sensors on an oil pipeline might be checked by a roving technician with a single mobile electronic device 502 and module 503, plugging into sensor stations as they move.

In another embodiment of this apparatus auxiliary device 501 may not be directly connected to module 503. Module 503 may include some kind of wireless capability such as, but not limited to, infrared, Wifi, Bluetooth, 3G, CDMA, or LTE. While bandwidth of this apparatus is not high in the case where data communications takes place exclusively by means of audio frequency signals, this wireless capability could be used for switching of devices such as, but not limited to, lights, alarm systems, TVs, etc. or reading data remotely from devices such as RF ID tags, alarm systems, and so on. Note that audio frequency communications could take place either through the audio port or through the air or other medium surrounding the apparatus, by means of a speaker and microphone, either of which may be present on the mobile electronic device or the auxiliary device. Audio frequency in the context of the invention described herein is not meant to be limited only to the range humans can hear, as it may prove useful to shift signals to a range above or below what humans can hear.

In another embodiment of this apparatus, the auxiliary device 501 may merely be powered by the circuits herein described, and communications with mobile electronic device 502 may take place entirely wirelessly, in one or in both directions. This allows for significantly higher bandwidth communications, and thereby a more sophisticated auxiliary device 501. This wireless capability may include, but is not limited to, infrared, Wifi, Bluetooth, 3G, CDMA, or LTE.

Figure 6:
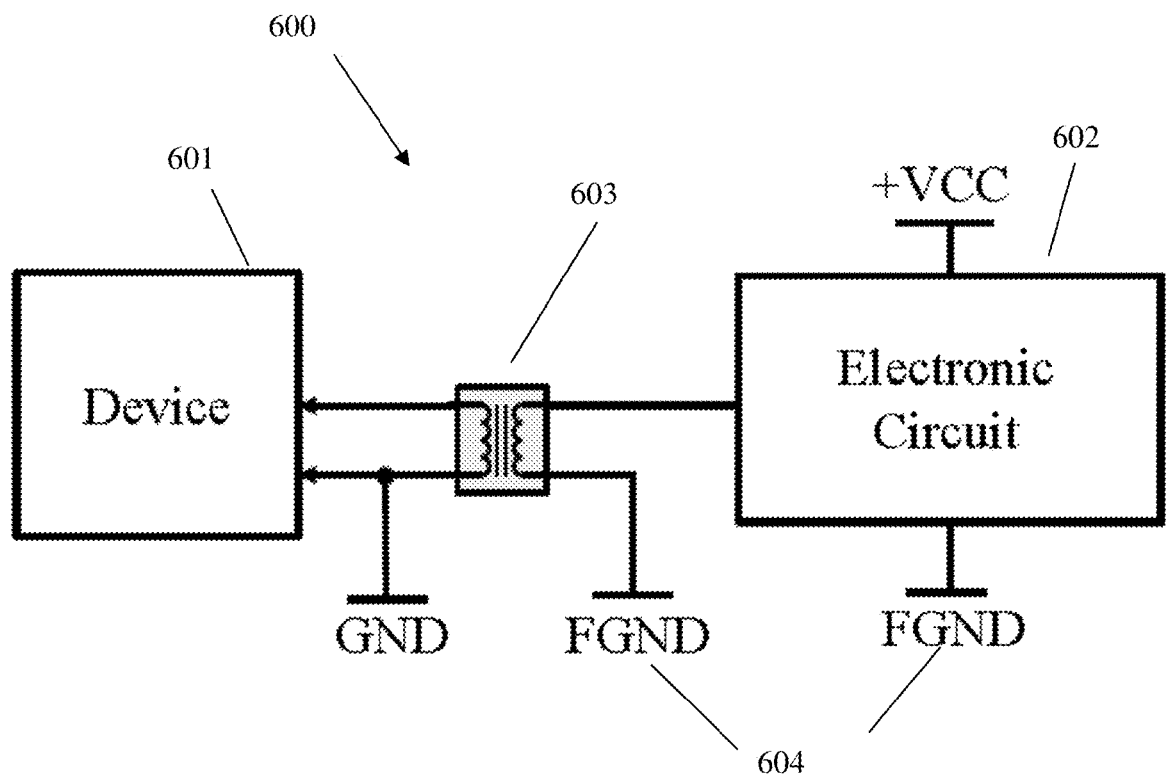
FIG. 6 shows a block diagram of another embodiment of a mobile electronic device, a signal and data processing circuit and an auxiliary device or sensor incorporating a transformer.

In another embodiment of this apparatus 600, shown in FIG. 6, mobile electronic device 601 is connected to module 602 by means of a transformer 603 coupled to the microphone input on the audio port of mobile electronic device 601. In this embodiment, module 602 shares a floating ground 604 with one leg of the transformer 603. This embodiment may have the advantage of reduced ripple and noise cross talk between the mobile electronic device 601 and the module 602, at the cost in weight, space and money of adding a transformer to the apparatus.

Figure 7:
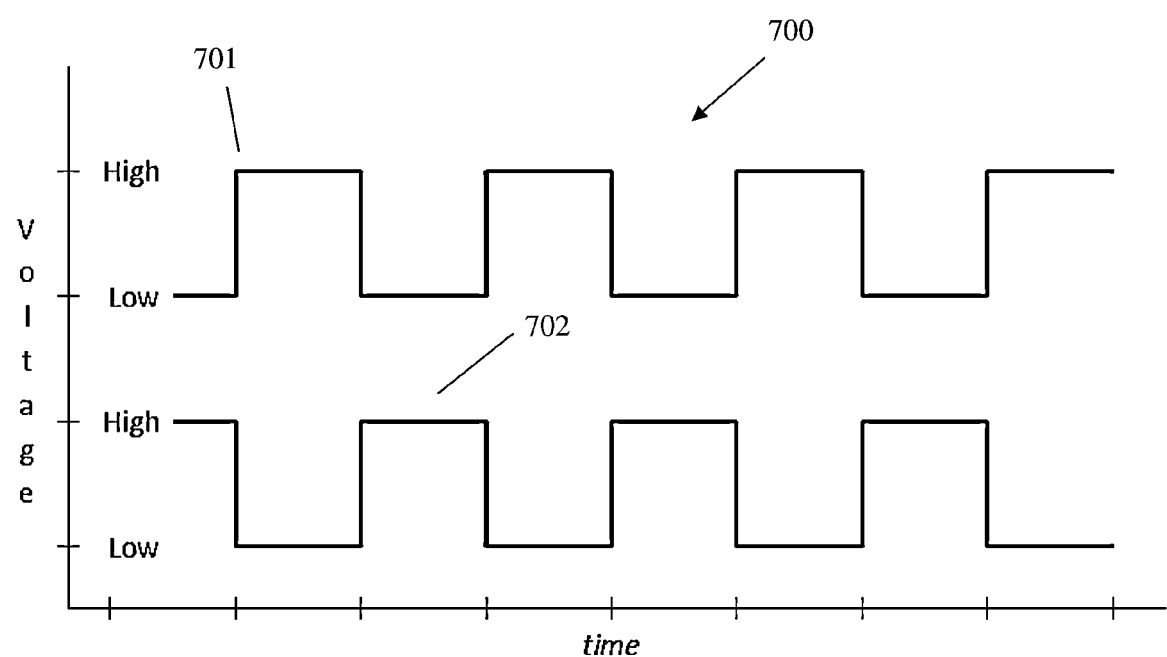
FIG. 7 shows an example of an out-of-phase square wave signal output from an audio port.

In another embodiment of this apparatus, the mobile electronic device 203 is set to output a specific waveform from the audio port 202. An example of this waveform 700 is shown in FIG. 7. The Left 209 and Right 210 outputs of the audio port 202 are set to produce approximately square waves which are out of phase with each other. Thus when the voltage 701 from the Left output 209 of the audio port 202 is high, the voltage 702 from the Right output 210 of the audio port 202 is low, and when the voltage 701 from the Left output 209 of the audio port 202 is low, the voltage 702 from the Right output 210 of the audio port 202 is high. This has several beneficial results, one of which may be reducing ripple current and voltage when these signals are used to generate power. Another benefit is that using approximately square waves rather than sine waves may provide higher total voltage and power output when these signals are converted to power using a power conversion circuit. Such an out-of-phase square wave pattern for an audio output of the mobile electronic device may be desirable for any power generation circuit embodiment discussed for this apparatus, for the reasons given above.

Figure 8A:
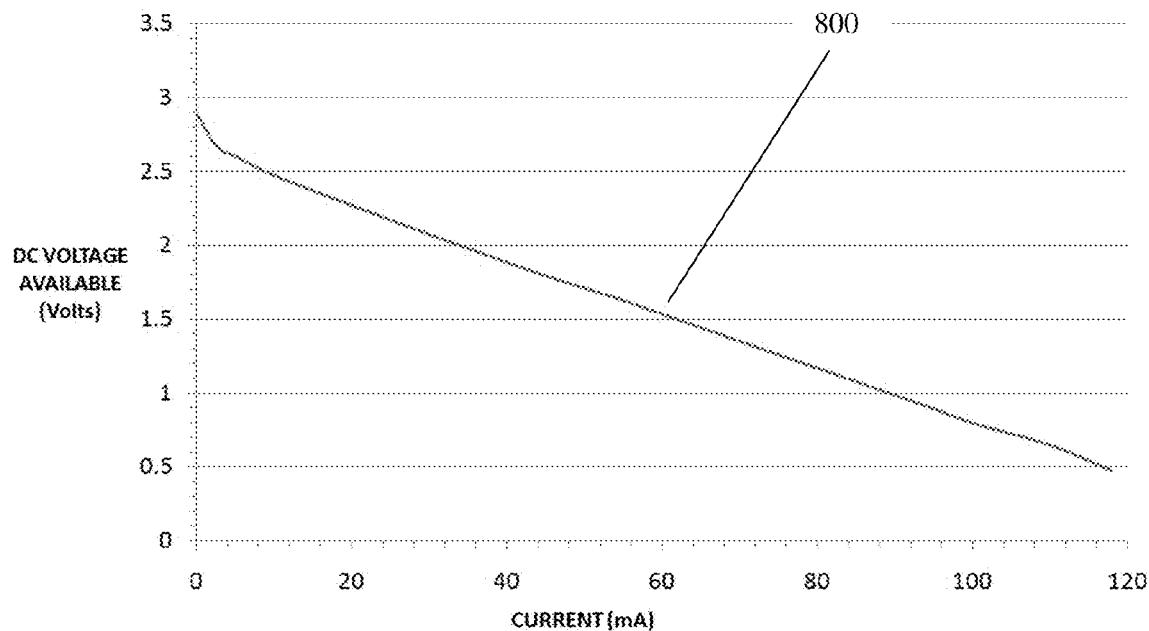
FIG. 8A shows a voltage vs. current output from an exemplary power generation circuit and FIG. 8B a power vs. voltage plot of this exemplary power generation circuit.
Figure 8B:
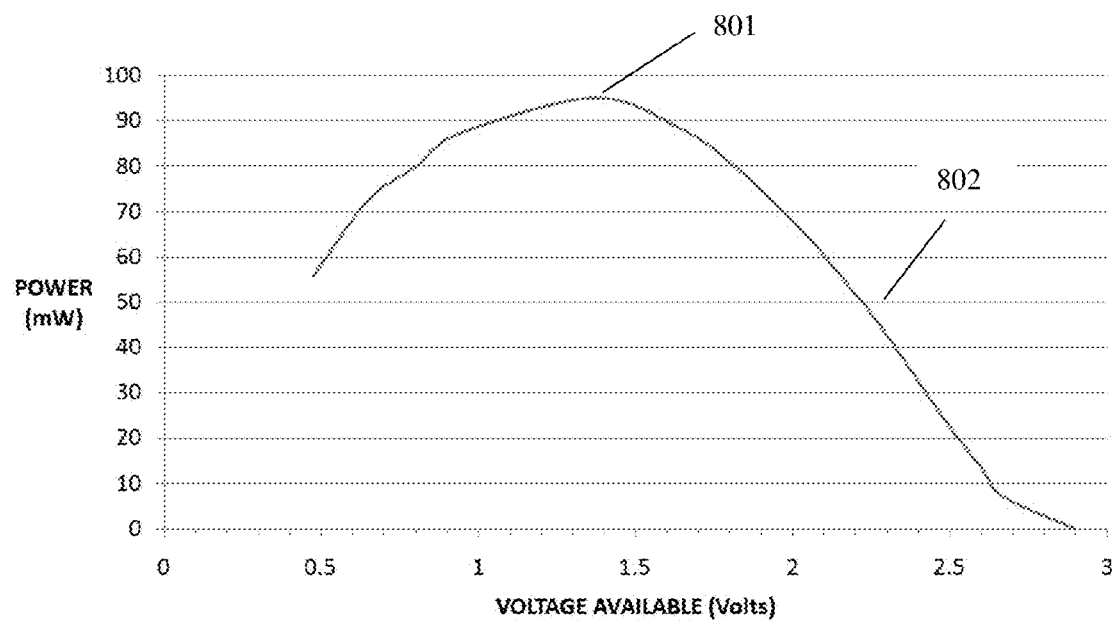

A calculated profile 800 of voltage available which can be generated by this method vs. load current is seen in FIG. 8A, showing that over about 2 VDC can be generated for currents as high as about 35 milliamps, and about 1 VDC up to currents of about 90 milliamps. A calculated plot of voltage available as a function of power consumed by module 201 and auxiliary device 207 appears in FIG. 8B, and shows that peak power 801 is available at approximately 1.4 VDC, but power above about 45 mW is still available up to voltages of about 2.2 VDC as shown by 802, well into the range of many useful electronic circuits. Tests with actual devices have confirmed that the calculated profile matches actual output within about 5%. Modern electronic circuits designed for mobile use generally require about 3 VDC or lower for operation, with a trend towards 2 VDC or below. In particular embodiments, the output power of the apparatus disclosed herein may be about 80 mW in the voltage range from about 0.8 to about 1.8V at an efficiency of about 58% or greater. Peak power is achieved at approximately 70% efficiency. The data shown here is exemplary for a circuit involving low $V_f$ Schottky diodes, and not meant to limit the scope of this invention, since specific voltage, current and power available will depend strongly on the specific audio circuits available in the specific mobile electronic device 203. In a specific embodiment, use of synchronous rectification could yield even higher outputs and efficiencies than those shown.

It should be understood that the foregoing description is only illustrative of the embodiments. It should also be understood that the embodiments disclosed herein may be used individually or in any suitable combination thereof. Various alternatives and modifications can be devised by those skilled in the art without departing from the embodiments. Accordingly, the present embodiments are intended to embrace all such alternatives, modifications and variances.

What is claimed is:

1. An electrical generation system comprising a mobile electronic device, an audio port on the mobile electronic device, a time varying signal generated by the mobile electronic device and output at the audio port, and a power generation circuit including a rectification section connected to the audio port which generates electrical power from the signal, the power generation circuit generating a DC voltage without significantly amplifying the time varying signal generated by the mobile device.

2. An electrical generation system as defined in claim 1, wherein the time varying signal comprises two out-of-phase waves.

3. An electrical generation system as defined in claim 1, further comprising a ground of the power generation circuit which is not connected to the ground of the audio port.

4. An electrical generation system as defined in claim 1, further comprising a ground of the power generation circuit which is connected to the ground of the audio port.

5. An electrical generation system as defined in claim 1, wherein the electrical generation system further comprises a voltage boosting system which boosts DC voltage beyond that of the peak-to-peak range of the time varying signal.

6. An electrical generation system as defined in claim 1, further comprising software designed to run on the mobile electronic device and cause the mobile electronic device to output the time varying signal at the audio port.

7. An electrical generation system as defined in claim 1, wherein the electrical power is used to operate a payment transaction device.

8. An apparatus comprising a mobile electronic device, an audio port on the mobile electronic device, a time varying signal generated by the mobile electronic device and output at the audio port, and a power generation circuit including a rectification section connected to the audio port which generates electrical power from the signal, the power generation circuit generating a DC voltage without significantly amplifying the time varying signal generated by the mobile device, and an auxiliary device which draws power from the power generation circuit, there being data passed between the mobile electronic device and the auxiliary device in at least one direction through the audio port.

9. An apparatus as defined in claim 8, wherein the data is coded via a method selected from the group of DTMF (dual tone multi-frequency), FSK (frequency shift keying), PSK (phase shift keying) or audio modem standards.

10. An apparatus as defined in claim 8, wherein the auxiliary device may generate power and send it through the audio port to the mobile electronic device.

11. An apparatus as defined in claim 8, wherein the apparatus further comprises a voltage boosting system which boosts DC voltage beyond that of the peak-to-peak range of the signal.

12. An apparatus as defined in claim 8, wherein data is passed in at least one direction between the mobile electronic device and the auxiliary device wirelessly.

13. An apparatus as defined in claim 8, wherein the auxiliary device comprises a sensor.

14. A method of using a mobile electronic device to power an auxiliary device, comprising the steps of:
providing an audio port on the mobile electronic device, the audio port having at least two output channels; generating a time varying signal by operating the mobile electronic device; generating DC voltage from the signal using power generation circuitry which includes a rectifier section, the power generation circuit generating DC voltage without significantly amplifying the time varying signal generated by the mobile device; and powering the auxiliary device by the DC voltage.

15. A method as defined in claim 14, wherein generating the time varying signal comprises generating two out-of-phase waves.

16. A method as defined in claim 14, further comprising not connecting the ground of the power generation circuit to the ground of the audio port.

17. A method as defined in claim 14, further comprising connecting the ground of the power generation circuit to the ground of the audio port.

18. A method as defined in claim 14, further comprising the step of grounding the circuitry in the auxiliary device to a ground selected from the group of a negative supply voltage generated by the power generation circuitry or a floating ground.

19. A method as defined in claim 14, wherein operating the mobile electronic device and generating the time varying signal comprises running software on the mobile electronic device which causes generation of the time varying signal by the mobile electronic device.

20. A method as defined in claim 14, further comprising the steps of generating power from the auxiliary device and sending the power through the audio port to the mobile electronic device.

21. A method as defined in claim 14, further comprising the step of boosting DC voltage from the power generation circuit beyond the peak-to-peak voltage range of the signal.

22. A method as defined in claim 14, wherein connecting to the auxiliary device includes the steps of; connecting to the mobile electronic device through a data module; and passing data through the data module in at least one direction between the mobile electronic device and the auxiliary device through the audio port of the mobile electronic device.

23. A method as defined in claim 22, further comprising the step of encoding the data via a method selected from the group of DTMF (dual tone multi-frequency), FSK (frequency shift keying), PSK (phase shift keying) or audio modem standards.

24. A method as defined in claim 14, further comprising the step of coupling the data signal between the data module and the mobile electronic device by using a circuit maintaining DC isolation between the two devices.

25. A method as defined in claim 14, further comprising the step of; using the electrical power to operate an auxiliary device comprising a payment transaction device.

26. A method as defined in claim 14, wherein the auxiliary device is generating the data from a sensing device.

27. An electrical generation system comprising a mobile electronic device, an audio port on the mobile electronic device, a time varying signal generated by the mobile electronic device and output at the audio port, and a power generation circuit connected to the audio port which generates electrical power from the signal, the output power of the power generation circuit being about 80 mW or greater in the voltage range from about 0.8 to about 1.8 VDC at an efficiency of about 58% or greater.

\* \* \* \* \*